US012766549B2

(12) United States Patent
Bolles et al.

(10) Patent No.: US 12,766,549 B2
(45) Date of Patent: Oct. 20, 2026

(54) CHEMICAL REACTIVATION METHOD TO ADHERE COATINGS DIRECTLY TO METAL SURFACES

(71) Applicant: The Boeing Company, Arlington, VA (US)

(72) Inventors: Jason Alan Bolles, Kent, WA (US); Jay Victor Covey, Kent, WA (US); Scott Allen Davis, Everett, WA (US)

(73) Assignee: THE BOEING COMPANY, Arlington, VA (US)

( * ) Notice: Subject to any disclaimer, the term of this patent is extended or adjusted under 35 U.S.C. 154(b) by 0 days.

(21) Appl. No.: 18/803,158

(22) Filed: Aug. 13, 2024

(65) Prior Publication Data

US 2026/0048415 A1 Feb. 19, 2026

(51) Int. Cl.
*B05D 7/14* (2006.01)
*B05D 3/10* (2006.01)
*B05D 7/00* (2006.01)

(52) U.S. Cl.
CPC ............... *B05D 7/14* (2013.01); *B05D 3/102* (2013.01); *B05D 7/534* (2013.01); *B05D 2202/25* (2013.01); *B05D 2503/00* (2013.01)

(58) Field of Classification Search
CPC .......... B05D 7/14; B05D 7/534; B05D 3/102; B05D 2202/25; B05D 2503/00
See application file for complete search history.

(56) References Cited

U.S. PATENT DOCUMENTS 5,789,085 A * 8/1998 Blohowiak ............ B05D 3/102 428/447
2008/0050598 A1* 2/2008 Bateman .................... C08J 7/12 428/537.1
2019/0382599 A1* 12/2019 Simons .................... C08K 3/04
2023/0357595 A1* 11/2023 Schuette .................. B05D 7/52

FOREIGN PATENT DOCUMENTS

WO WO-2015123520 A1 * 8/2015 ......... C23C 18/1254

OTHER PUBLICATIONS

D.H. Berry et al., "Chemical Reactivation as a Method for Replacing Scuff Sanding and for Applying Stencils on Aerospace Topcoats," Report presented at 2011 Air Force Corrosion Conf., Aug. 16-18, 2011, Robins AFB, GA, retrieved from https://apps.dtic.mil/sti/tr/pdf/ADA568546.pdf on Oct. 13, 2025. (Year: 2011).*

(Continued)

*Primary Examiner* — William P Fletcher, III
(74) *Attorney, Agent, or Firm* — MH2 Technology Law Group LLP

(57) ABSTRACT

A method for adhering a coating to a metal substrate includes exposing a surface of a metal substrate to a solvent, applying a sol-gel treatment to the metal substrate, drying the treated metal substrate, applying a chemical reactivator to the treated metal substrate, and applying a polymer coating to the metal substrate. The method can include cleaning the metal substrate with an alkaline cleaner prior to exposing a surface of a metal substrate to a solvent. The polymer coating may include a polyurethane or a clear polymer coating. An article includes a metal substrate, coated with a sol-gel coating layer, chemical reactivator layer, and a clear polymer coating.

20 Claims, 3 Drawing Sheets

(56) References Cited

OTHER PUBLICATIONS

D.H. Berry et al., "Chemical Reactivation of Exterior Decorative Aerospace Topcoats," SAMPE Journal, vol. 49, No. 2, Mar./Apr. 2013. (Year: 2013).*

Alconox Technical Bulletin retrieved from https://www.alconox.com on Oct. 13, 2025. (Year: 2025).*

Extended European Search Report for EP Application No. 25192069.0, dated Feb. 24, 2026.

Andreatta F et al: "Corrosion behaviour of sol-gel treated and painted AA2024 aluminium alloy", Process in Organic Coatings, Elsevier BV,NL,vol. 69, No. 2,Oct. 1, 2010, pp. 133-142.

Partial European Search Report for European Application No. 25192069.0 dated Dec. 5, 2025, 16 pages.

* cited by examiner

CHEMICAL REACTIVATION METHOD TO ADHERE COATINGS DIRECTLY TO METAL SURFACES

TECHNICAL FIELD

The present teachings relate generally to coatings for metal surfaces and, more particularly, to improved methods of adhering coatings to metal surfaces in aerospace applications.

BACKGROUND

In high erosion areas of aircraft and aerospace vehicles, for example, vertical fin and cockpit window frame, polyurethane clearcoat or other protective coatings can be applied in these areas as a paint or coating stencil, paint edge seal, or other locations on aircraft, in examples, directly over metallic surfaces. In aerospace vehicles, such as the Boeing 737, frequent adhesion failures of the clearcoat during a demask processing step or in test flight can occur. These lead to unacceptable appearance standards or performance standards in terms of the effectiveness of protective coatings for these high erosion areas.

Current coating methods include the use of solvents to clean the metal or metallic surfaces of an aircraft prior to clearcoat or other surface coatings being applied. This can be tested and demonstrated by employing rain erosion testing to predict such erosion defects. Using a previously developed sol-gel coating alone or using or adhesion promoters as separate coatings has not yet proven to be effective in mitigating erosion defects during aircraft service.

Therefore, it is desirable to develop methods and materials systems that provide sustained and effective erosion resistant coating systems for use in aerospace applications.

SUMMARY

The following presents a simplified summary in order to provide a basic understanding of some aspects of one or more embodiments of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

A method for adhering a coating to a metal substrate is disclosed. The method for adhering a coating to a metal substrate includes exposing a surface of a metal substrate to a solvent. The method for adhering a coating to a metal substrate also includes applying a sol-gel treatment to the metal substrate. The method for adhering a coating to a metal substrate includes drying the treated metal substrate. The method also includes applying a chemical reactivator to the treated metal substrate. The method also includes applying a polymer coating to the metal substrate. Implementations of the method for adhering a coating to a metal substrate may include cleaning the metal substrate with an alkaline cleaner prior to exposing a surface of a metal substrate to a solvent. The sol-gel treatment is applied in a thickness range of from about 0.5 microns to about 2 microns. The chemical reactivator is applied in a thickness range of below about 100 nanometers on top of the metal substrate after drying the treated metal substrate. The method for adhering a coating to a metal substrate may include applying additional coatings or treatments over the polymer coating. The solvent may include water. The solvent may have a pH level between about 8 to about 9. The metal substrate may include aluminum or an alloy thereof. Drying the treated metal substrate may include exposing the metal substrate to ambient conditions for at least one hour under ambient conditions in a controlled environment. The solvent further may include a mild detergent. The polymer coating may include a polyurethane. The polymer coating is a clearcoat, or transparent in a visible range. The polymer coating further may include a pigment or additive.

Another method to prevent erosion on leading edges of metal surfaces is disclosed. The method to prevent erosion on leading edges of metal surfaces includes treating the metal surface with a solvent. The method also includes applying a sol-gel treatment to the metal surface. The method also includes applying a chemical reactivator to the treated metal surface. The method also includes applying a polyurethane coating on the metal surface. Implementations of the method to prevent erosion on leading edges of metal surfaces may include drying the metal surface after applying a sol-gel treatment to the metal surface. The sol-gel treatment is applied in a thickness range of about 0.5 microns to about 2 microns, and the polyurethane coating has a thickness range of from about 50 microns to about 150 microns. The metal surface may include aluminum or an alloy thereof.

An article is disclosed, which includes a metal substrate. The article also includes a sol-gel coating layer disposed on a surface of the metal substrate. The article also includes a chemical reactivator layer disposed on the sol-gel coating layer. The article also includes a polymer coating disposed on the chemical reactivator layer. Implementations of the article include where the polymer is a transparent polyurethane. The metal substrate may include aluminum or an alloy thereof.

The features, functions, and advantages that have been discussed can be achieved independently in various implementations or can be combined in yet other implementations further details of which can be seen with reference to the following description.

BRIEF DESCRIPTION OF THE DRAWINGS

The accompanying drawings, which are incorporated in and constitute a part of this specification, illustrate embodiments of the present teachings and together with the description, serve to explain the principles of the disclosure. In the figures.

Figures 1A, 1B:
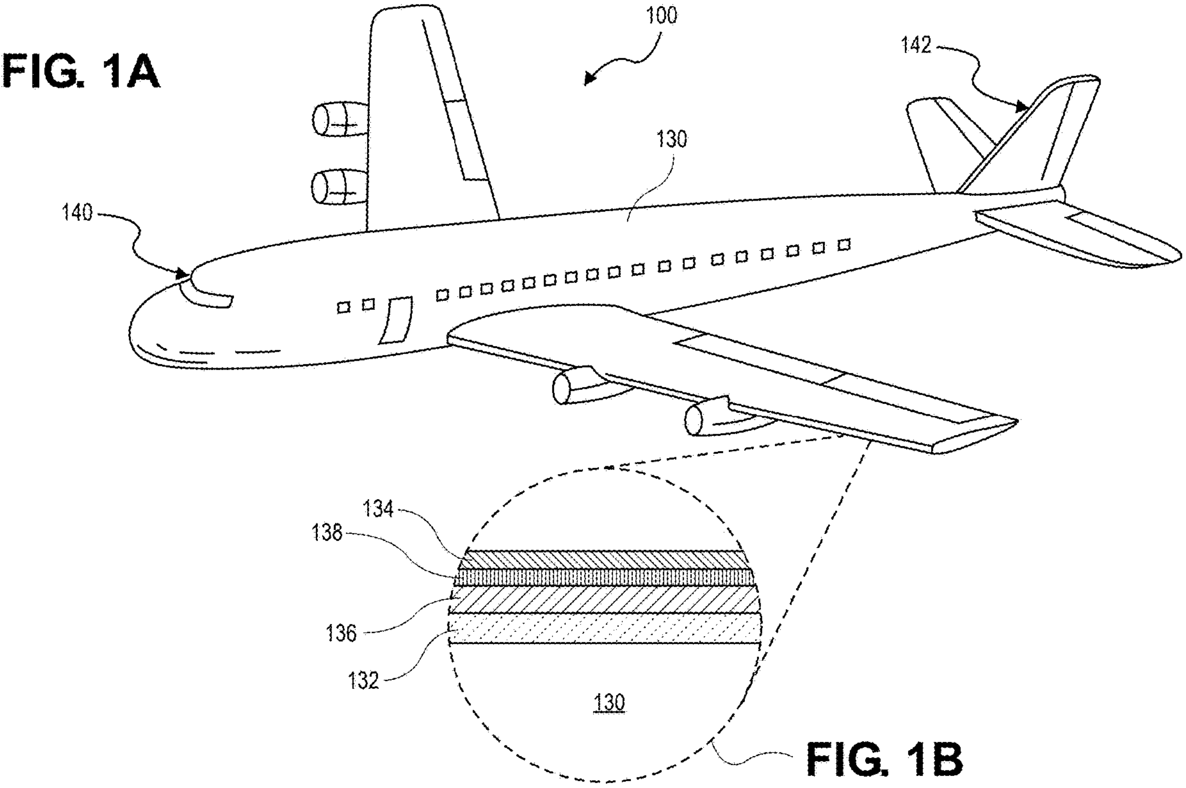
FIG. 1A depicts an application of one or more surfaces including an adhesive composition and methods applied to an aerospace vehicle.
FIG. 1B is an exploded view of a portion of the aerospace vehicle of FIG. 1A, in accordance with the present disclosure.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary embodiments of the present teachings, examples of which are illustrated in the accompanying drawings. Wherever possible, the same reference numbers will be used throughout the drawings to refer to the same, similar, or like parts.

For the purposes of this disclosure, a leading edge can refer to a section of portion of a vehicle or aircraft that is exposed to a forward-facing or foremost edge of an airfoil, such as a fin, wing, stabilizer, or propellor blade. Such structural features can be susceptible to erosion while in service in a vehicle or aircraft.

For the purposes of this disclosure, ambient conditions refer to the general environmental conditions in an area. For example, if the ambient conditions of a testing environment are described, they refer to the general environment of a testing procedure while the procedure is being conducted. In an example relating to a service environment of a vehicular component, the ambient conditions can refer to the environmental conditions the part or leading edge of a component is exposed to while in service. Ambient conditions can include temperature, light exposure, chemical exposure, relative humidity exposure, salt exposure, and the like.

For the purposes of the present disclosure, a controlled environment is an enclosed area with specific parameters regulated, including air temperature, pressure, light, airflow, particle level, and humidity. An example of a controlled environment can include a laboratory or a room having controlled parameters as described previously, that is separated from other operations, rooms, environmental conditions, or parameters. A controlled environment can include an enclosed space where specific environmental conditions are actively managed. Controlled environments can include a temperature range of room temperature, or approximately 70° F. to about 80° F. and 75% relative humidity (RH) to about 90% relative humidity, or at about 75° F. 90% RH.

The present disclosure provides a method or process for adhering a polymer coating, in examples, a polyurethane coating, directly to a metallic surface without the need for an epoxy primer or any other primer. Products currently exist to adhere similar coatings with the use of an epoxy primer directly to metallic surfaces. This product, a sol-gel treatment coating is widely used in the production system and on aircraft and airplanes. Adhesion promoters, such as Paintbond SM-1, which promotes adhesion between 2 layers of polyurethane coating are also available. In the methods of the present disclosure, two formulations of a sol-gel treatment coating and an adhesion promoter, also referred to herein as a chemical reactivator, are used in combination, where the sol-gel treatment is first applied on a metallic surface or substrate. After drying, a primer or adhesion promoter is applied directly over the sol-gel treatment. Polyurethane or other polymer coatings applied over this combination of layers have demonstrated, both in rain erosion testing and in-service performance, to have acceptable adhesion. This combination includes no foreseen drawbacks other than additional steps during production, including alkaline cleaning and sol-gel application in the direct to metal areas of a vehicle or aerospace component. Thus, a coating can be directly applied to a metallic surface without the need for a primer.

The sol-gel treatment can be used in one or more production systems on airplanes or aerospace vehicles. In methods of the present disclosure, the two formulations, the sol-gel treatment is applied on the metallic surface, then after drying, the chemical reactivator, is applied directly over the sol-gel treatment. Polyurethane or other polymer coatings applied over this combination of layers in concert with the presently disclosed method have demonstrated in rain erosion testing and in-service performance to have acceptable adhesion. Examples of sol-gel treatments can be found in, for example, U.S. Pat. No. 5,789,085, issued Aug. 4, 1998.

1. The Sol Coating

Sol coating of metals achieves resin-to-substrate bonding via chemical linkages (covalent bonds, hydrogen bonds, or van der Waals forces) while minimizing environmental impacts otherwise caused by the traditional use of highly diluted hazardous metals. A preferred sol for making the sol coating (also called a sol-gel film) on metals as described herein include an organozirconium compound (such as tetra-n-propoxyzirconium) to covalently bond to the metal through Zr and an organosilane (such as 3-glycidoxypropyltrimethoxysilane) to covalently bond to the organic primer, adhesive, or resin (with an acetic acid catalyst in water-based formulations as a catalyst and Zr hydrolysis rate stabilizer).

In a successful surface treatment, the typical failure mode for adhesively bonded specimens in a hot/wet environment is cohesive failure in the organic adhesive layer. In such cases, the sol-gel film is stronger than the bulk adhesive, so the adhesive bond is as strong as possible. It has been shown, however, that in examples of specific metal substrate and paint or polymer coating combinations, the sol-gel treatment may not provide sufficient adhesion.

In examples sol-gel chemistry can be used to develop binder coatings about 20-500 nm thick that produce a gradient from the metallic surface through a hybrid organometallic sol-gel film to the adhesive. Bond strength and durability in our preferred sol coating is increased by including organosilanes and organozirconium compounds. The organosilanes covalently bond to or otherwise associate with the organic adhesive resin or primer. Ideally, covalent bonding also occurs at the interface between the sol-gel and metal surface. Mechanical interactions may also play a role depending on the design (i.e., porosity, microstructure) of the sol coating. Durability of the sol-gel film in humid conditions depends on whether the film rehydrates. If the film is too thick, it becomes glassy.

The term “sol-gel,” a contraction of solution-gelation, refers to a series of reactions where a soluble metal species (typically a metal alkoxide or metal salt) hydrolyzes to form a metal hydroxide. The soluble metal species usually contain organic ligands tailored to correspond with the resin in the bonded structure. The metal hydroxides condense (peptize) in solution to form an hybrid organic/inorganic polymer. Depending on reaction conditions, the metal polymers may condense to colloidal particles or they may grow to form a network gel. The ratio of organics to inorganics in the polymer matrix is controlled to maximize performance for a particular application.

Many metals are known to undergo sol-gel reactions. Silicon and aluminum sol-gel systems have been studied extensively. Representative sol-gel hydrolysis and condensation reactions, using silicon as an example, are shown in equations (1) and (2).

$$Si(OEt)_4 + 2H_2\ OSi(OH)_4 + 4EtOH \text{ hydrolysis} \tag{1}$$

-continued $$Si(OH)_4\ SiO_2 + 2H_2O \text{ condensation} \quad (2)$$

wherein Et is $CH_3$—$CH_2$—. The hydrolysis and condensation reactions can be complete, resulting in complete conversion into the metal oxide or a hydrous metal hydroxide. They can be partial, leaving more of the alkoxide functionalities in the finished gel. Depending upon the reaction conditions, reactions (1) and (2) can produce discrete oxide particulates, as demonstrated in the synthesis of nanoscale particles, or they can form a network gel, which can be exploited in film formation. The solubility of the resulting gel in a solvent will depend upon the size of the particles and degree of network formation.

A clean and chemically active metal surface is important to bond a sol-gel film from the sol by spraying, immersing, or drenching. Cleaning is a key factor toward obtaining good adhesion. If the surface is dirty, bonding is blocked by the dirt or occurs between the sol and the dirt rather than between the sol and the surface. Obtaining a chemically active surface is not trivial. Titanium produces a passive oxide surface. A bare, pure titanium surface will immediately oxidize in air or dry oxygen to form a barrier titanium oxide film which has a thickness of 2-4 nm (20-40 Å). Titanium surface oxides do not hydrolyze as readily as aluminum surface oxides to form active metal hydroxides. Water will, however, chemisorb onto the surface of the titanium oxide. Aluminum oxidizes as quickly, or more quickly in air.

$HNO_3$—HF etching of titanium alloys removes $TiO_2$ alpha case, but creates a smooth surface which is difficult to bond to. Traditional alkaline etches like TURCO 5578 or OAKITE 160, produce a roughened surface better suited for adhesive bonding, but produce a tenacious smut layer. The smut causes adhesion to be reduced dramatically. Extended soaking in hot $HNO_3$ after the alkaline etch still leaves some smut. In our preferred process, we clean and rinse the surface, etch with $HNO_3$-HF, rinse again, and alkaline etch. Again after another rinse, the surface is desmutted with BOECLENE once or in multiple stages to produce a clean and active surface best suited for adhesive bonding through the sol coating of the present disclosure.

An accepted model of the formation of a sol-gel film on titanium involves Lewis acid/base interaction of a hydrolyzed zirconium alkoxide, an organosilane, or both in the sol with the titanium oxide surface. This interaction is possibly assisted by chemisorbed water to cause the formation of a coupled Zr—O—Ti or Si—O—Ti linkage and a new Ti—OH bond on the surface. A similar reaction occurs on aluminum. The ability of the metal alkoxides to covalently bond with the metal surface most likely requires more energy in the case of titanium than aluminum. Complete coupling and formation of covalent bonds with titanium alloys may not occur until the part reaches higher temperatures, such as they usually experience during adhesive curing.

Sol-gel chemistry can be versatile. Reaction conditions (for example, concentration of reagents and catalyst type) control the relative rates of the hydrolysis and condensation reactions. Sol-gel solutions can be prepared which readily form thin films or which condense to fine colloidal particles. Starting materials and reaction conditions can produce films with morphology similar to surface coatings achieved with anodize and etch processes. Density, porosity, and microstructure can be tailored by controlling the chemistry of the sol.

Sol-gel condensation reactions are affected by the acid-base character of the metal/oxide surface. The isoelectronic point (IEP, a measure of surface pH) for titanium is more acidic (IEP=6.0) than an aluminum surface (IEP=9.2), which changes the surface chemistry of the metal with the sol.

Exemplary zirconium compounds for making the sol include those of the general formula $(R—O)_4$ Zr wherein R is a lower aliphatic having 2-5 carbon atoms, especially normal aliphatic (alkyl) groups, and, preferably, tetra-n-propoxyzirconium, because of its being readily available commercially. We believe that branched aliphatic, alicyclic, or aryl groups would also perform satisfactorily. For applications involving extended exposure to hot/wet conditions, the organo moiety on the zirconium can be tailored to have improved thermo-oxidative stability.

Illustrative organosilane compounds (available from Petrarch or Read) for making the sol can include:
3-aminopropyltriethoxysilane,
3-glycidoxypropyltrimethoxysilane,
p-aminophenylsilane,
allyltrimethoxysilane
n-(2-aminoethyl)-3-aminopropyltrimethoxysilane
3-aminopropyltriethoxysilane
3-aminopropyltrimethoxysilane
3-glycidoxypropyldiisopropylethoxysilane
(3-glycidoxypropyl)methyldiethoxysilane
3-glycidoxypropyltrimethoxysilane
3-mercaptopropyltrimethoxysilane
3-mercaptopropyltriethoxysilane
3-methacryloxypropylmethyldiethoxysilane
3-methacryloxypropylmethyldimethoxysilane
3-methacryloxypropyltrimethoxysilane
n-phenylaminopropyltrimethoxysilane
vinylmethyldiethoxysilane
vinyltriethoxysilane or
vinyltrimethoxysilane.

In these organometallics, the organo moiety preferably is aliphatic or alicyclic, and generally is a lower n-alkoxy moiety having 2-5 carbon atoms. The organosilane includes typically an epoxy group (for bonding to epoxy or urethane resins or adhesives) or a primary amine (for bonding to polyimide resins or adhesives).

If the sols are alcohol-based, the preferred alcohols are ethanol, isopropanol, or another lower aliphatic alcohol.

The sols can be used to make sol-gel films on the following aluminum and titanium alloys: Al 2024; Al 7075; Ti-6-4; Ti-15-3-3-3; Ti-6-2-2-2-2; and Ti-3-2.5. The present method can also include or can also be used with copper or ferrous substrates, including stainless steel or an Inconel alloy, aluminum alloys, titanium alloys, anodized aluminum, or combinations thereof, or chromic acid anodized aluminum, boric sulfuric acid anodized aluminum, or conversion coated metals, or any combination thereof.

The chemical reactivator, which in examples can be referred to as Paintbond SM-1 promotes adhesion within the method and coating system of the present disclosure. The chemical reactivator can include a zirconium or other metal alkoxide in a solvent formulation.

FIG. 1A depicts an application of one or more surfaces of a structural component including an adhesive composition applied to an aerospace vehicle. FIG. 1B is an exploded view of a portion of the aerospace vehicle of FIG. 1A, in accordance with the present disclosure. An application of the presently disclosed coating composition or method is shown on an aerospace vehicle 100, whereby a vehicle component substrate 130 is fabricated using the presently disclosed method or process for adhering a polymer coating. Exploded view FIG. 1B is shown, having vehicle component substrate 130 or surface thereof with a metal substrate surface layer 132, sol-gel composition layer 136, and chemical reactivator layer 138 so as to adhere a polymer coating 134 to a surface of the substrate 130, and/or onto a structural component of or onto a portion of a vehicle 100, and in particular, a leading edge of a vehicle 100. In examples, the application of the presently disclosed method for adhering a polymer coating is directed to an external surface of the aerospace vehicle 100. In examples, additional coating layers, such as paints, coatings, or other protective coatings can be applied upon the polymer coating 134. Of further note is that FIG. 1B is located towards an area of a leading edge in a typical aircraft or aerospace vehicle 100, which is where the improved polymer coating 134 finds applicability based on its improved adhesion, based on the composition and methods associated with the application of the sol-gel composition layer 136 and chemical reactivator layer 138. While a location or area of a leading edge, such as a cockpit window, tailfin, or wing may be shown, other areas or locations in an aerospace vehicle 100 or other structure may be coated according to the present methods as well. For example, the use of method for adhering a polymer coating 134 can be targeted on an aircraft on or near doorway edges, vertical fins, wing edges, engine inlets, stencil coatings of metallic surfaces, decal applications to metal surfaces, and the like. In examples, metal substrates or surfaces including with microstructures such as high-strength alloys like 70T6 or low-strength alloys like 60T6 can be used in conjunction with methods of the present disclosure.

Composite structures of the present disclosure can include a metal substrate at the surface, along with one or more additional composite or metallic material layers adhered to at least a portion of the substrate whereupon a polymer coating may be adhered. In examples, a top layer of the substrate comprises a metal or metal alloy, for example, aluminum, stainless steel, titanium, low carbon steel, aerospace grade metals, or alloys thereof. Suitable substrates can also, in a multilayered composite configuration, comprise organic polymers such as PEEK, PEKK, or bismaleimides (BMI) resins, or inorganic materials including ceramics, such as, for example, silicon dioxide ($SiO_2$) or aluminum oxide ($Al_2O_3$). The substrate can include metallic, organic, or inorganic materials, wherein the substrate is flat and/or has a low radius of curvature and/or has a high radius of curvature, depending on the nature of the application or the aerospace component in which it is used.

In other examples, multilayered composite material layers can include glass fibers, carbon fibers, aramid fibers, alumina fibers, ceramic fibers, or a combination thereof. Examples of polymer materials that can be used (e.g., as a substrate) that undergoes surface coating with a metallic coating or polymer layer in accordance with the present disclosure include polymer materials that act as a matrix in combination with one or more types of fibers or other reinforcing or functional additives. In one example, materials useful for the practice of the present disclosure include fiber-reinforced plastics (FRP) comprising a polymer material in combination with an inorganic fiber such as fibers of carbon, carbon nanotubes, graphite, fiberglass, glass, metals, metal alloys, or metalized fibers and metal coated glass fibers, alumina fiber or boron fiber. In one example, the fiber reinforced plastic can comprise organic fiber such as a nylon fiber or aramid fiber. In one example, the fiber reinforced plastic can comprise organic fiber and/or inorganic fiber blended into a thermosetting polymer, such as an epoxy resin material. In one example, a portion of a multilayered composite laminate may be constructed of multiple layers of thermoset layers, fiber layers, or a mixture thereof.

In one example, a carbon fiber reinforced plastic (CFRP) or glass fiber reinforced plastic (GFRP) as the polymer article made therefrom is used as a material suitable for aircraft structures or the like. However, the present disclosure is not restricted to these types of materials or any particular arrangement, and articles formed from other polymers can also be used in the presently disclosed process of the present disclosure. In one example, the polymer substrate comprises a crystalline polymer. Crystalline polymers provide high temperature resistance as well as chemical resistance to FRPs. For example, epoxy-based polymers are crystalline and can be thermally stable up to temperatures as high as 260° C. and possibly higher depending on the specific formulation and additives used. In another example, the polymer substrate comprises a semi-crystalline polymer. Semi-crystalline polymers provide the benefits of crystalline polymers along with ductility and processing advantages to FRPs. In yet another example, the polymer substrate comprises an amorphous polymer. Amorphous polymers provide resiliency, ductility and processing advantages to FRPs. It should be noted that certain exterior surfaces can include combinations of the aforementioned polymer of composite materials with one or more metals, such as, for example, metal fasteners or other metal parts, where a combination of a primerless topcoats over composite material as well as intermittent placement of metals may be present. The presently disclosed method can enable improved adhesion to metal portions of the assembly.

Figure 2:
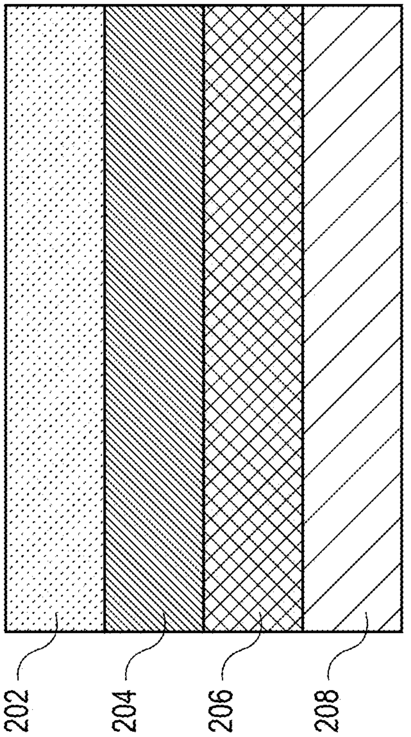
FIG. 2 (PRIOR ART)
FIG. 2 is a cross-sectional view of a known prior art coating structure for a metal surface, in accordance with the present disclosure.

FIG. 2 is a cross-sectional view of a known prior art coating structure for a metal surface, in accordance with the present disclosure. In existing prior art examples, various materials and surface coatings or primer systems can be used to adhere polymer coatings with the use of an epoxy primer directly to metallic surfaces. In this example, a sol-gel treatment coating 204, is applied to a metal or metallic substrate surface 202. Next, an epoxy primer 206 is applied to the sol-gel treatment coating 204. This is followed by a clearcoat material or pigmented material comprising a polymer coating 208. Exemplary polymer coatings include polyurethane polymers.

Figure 3:
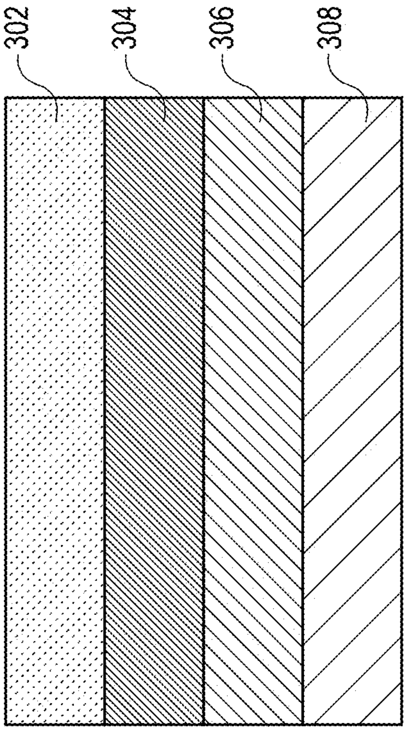
FIG. 3 is a cross-sectional view of a coating structure for a metal surface using a chemical reactivation process, in accordance with the present disclosure.

FIG. 3 is a cross-sectional view of a coating structure for a metal surface using a chemical reactivation process, in accordance with the present disclosure. The coating structure can be described as follows: a metal substrate 302, a sol-gel coating layer 304 disposed on the metal substrate 302 surface, a chemical reactivator layer 306 disposed on the sol-gel coating, and a polymer coating 308 disposed on the chemical reactivator layer. In examples, the polymer comprises a clear, transparent, or pigmented polymer, such as a transparent polyurethane or a clear polyurethane, and in illustrative examples, a clear or pigmented polyurethane. The metal substrate comprises aluminum or an alloy thereof, in examples. Other illustrative examples include substrates having metallic surfaces as described herein.

Figure 4:
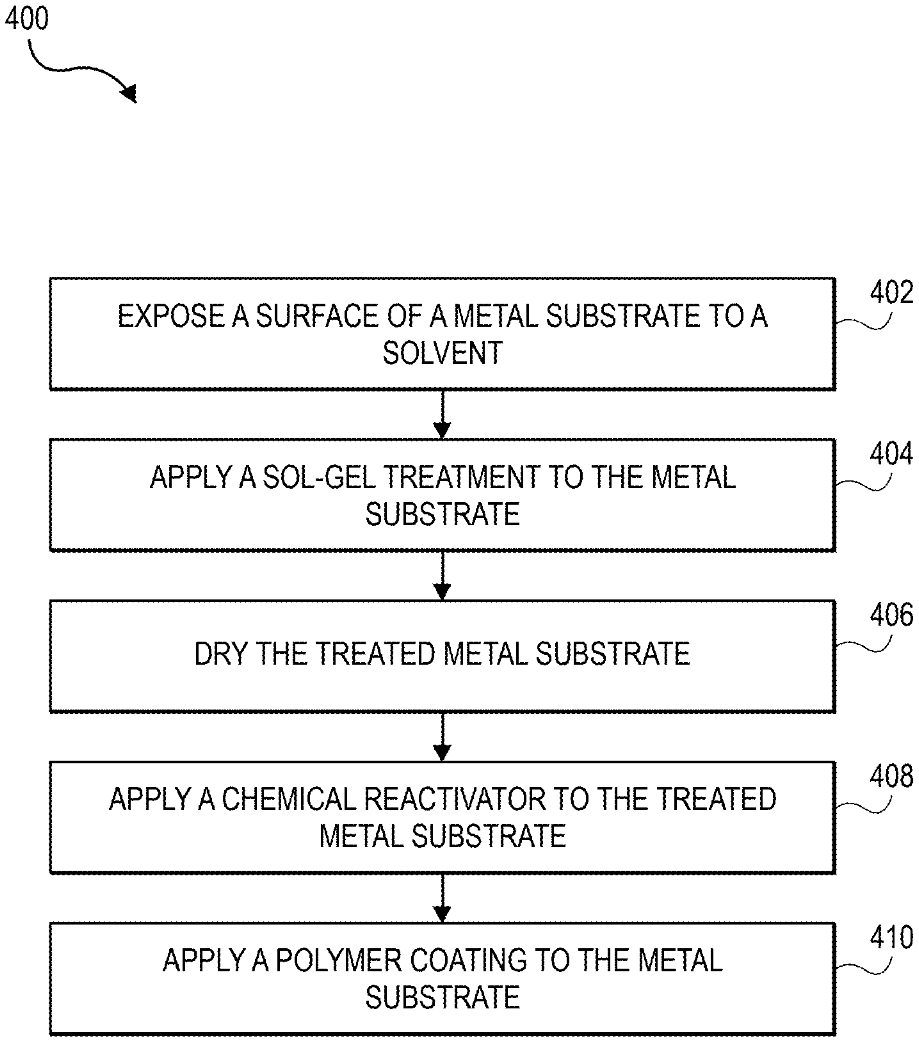
FIG. 4 is a flowchart illustrating a chemical reactivation process for adhering a coating to a metal surface, in accordance with the present disclosure.

FIG. 4 is a flowchart illustrating a chemical reactivation process for adhering a coating to a metal surface, in accordance with the present disclosure. A method 400 is illustrated for adhering a coating to a metal substrate, comprising exposing a surface of a metal substrate to a solvent 402, applying a sol-gel treatment to the metal substrate 404, drying the treated metal substrate 406, applying a chemical reactivator to the treated metal substrate 408, and applying a polymer coating to the metal substrate 410. In examples, the method 400 for adhering a coating to a metal substrate includes cleaning the metal substrate with an alkaline cleaner prior to exposing a surface of a metal substrate to a solvent. Certain cleaning procedures can include the use of surface abrasion and deoxidation with a chemical acid etch solution. In examples, of method 400 for adhering a coating to a metal substrate, the sol-gel treatment is applied in a thickness range of from about 0.5 microns to about 2 microns. In examples of the method 400 for adhering a coating to a metal substrate, the chemical reactivator is applied in a thickness range of below about 100 nanometers on top of the metal substrate after drying the treated metal substrate. In some configurations, the method 400 for adhering a coating to a metal substrate further includes applying additional coatings or treatments over the polymer coating, such as described herein. Solvents of the present disclosure can include water, methyl ethyl ketone (MEK), methyl propyl ketone (MPK), such as MEK:MPK 30:70, where the purpose is to completely remove any oils from the surface of the metal, such that the metal is hydrophilic after cleaning or treatments so that it will readily be coated by a water based sol-gel formulation. In other examples, the solvent used in the method 400 includes a mild detergent. In examples of the method 400 for adhering a coating to a metal substrate, the solvent has a pH level between about 8 to about 9. Drying conditions for the treated metal substrate or treated metal surface can include exposing the metal substrate to ambient conditions for at least one hour under ambient conditions in a controlled environment. In examples, from about 15 to about 30 minutes at 70° F. or until dry, and in some examples, up to 1 hour. In still other examples, the polymer coating has an optical property, for example, a gloss level, that is not affected by the combination of the sol-gel composition and the chemical reactivator composition. While preferable examples of a polymer coating can include polyurethanes, regardless of the polymeric composition of the polymer coating, the polymer coating is a clearcoat coating, which can be defined as a polymer coating that is transparent or clear in a visible range. In examples, the polyurethane coating is applied in a single layer without additional coatings or surface treatments configured to affect its optical properties. In alternate examples, the polymer coating further can include a pigment or additive. In examples, the pigment or additive may or may not impact the clear or transparent properties of the polymer coating. In examples, of the method, drying the metal surface can be done after applying a sol-gel treatment to the metal surface. In examples, other drying methods, such as heat guns, ovens, compressed air and the like can be used in assisted drying, where the exposure amounts to from about 1 to about 4 hours exposed to heat at about 120° F. In examples, the sol-gel treatment is applied in a thickness range of about 0.5 microns to about 2 microns, or from about 0.1 microns to about 10 microns, or from about 0.5 microns to about 5 microns. In examples, the polyurethane coating has a thickness range of from about 25 microns to about 250 microns, or from about 50 microns to about 200 microns, or from about 50 microns to about 150 microns. The metal surfaces coated using the methods as described herein can include aluminum, titanium, steel, or alloys thereof, as well as other metals or surfaces as described herein. These can include stainless steel or chromium electroplated steel (CRES). Solvents or other materials used in the erosion prevention method or surface coating method as described herein can include mild cleaners having no aggressive chemicals as ingredients. In examples, the environmental conditions during production can be controlled within a temperature range of about 20° C. to 25° C. and humidity level below 60%.

In aerospace applications where high-strength alloys are used, a mild detergent-based solution with pH 8-9 can be used to clean aluminum, aluminum alloys and other metal substrates without compromising the surface integrity of the substrate or negatively impacting subsequent coating steps. In examples, for lower-strength alloys like 60T6, an alkaline cleaning agent may be utilized at room temperature (20° C.-25° C.) and humidity levels below 30% to ensure thorough removal of impurities while maintaining a hydrophilic state.

In other examples, the solvent clean metal substrate step may involve using water-based solvents with surfactants or mild acids such as citric acid in combination with gentle agitation at ambient temperatures. For instance, a solution comprising deionized water (DI) and 0.1% sodium lauryl sulfate may be used to effectively remove surface contaminants without compromising the metal's natural oxide layer.

In examples, ultrasonic cleaning techniques may be employed along with the use of mild detergents or surfactants dissolved in deionized (DI) water at temperatures between 20° C.-40° C. (68° F.-104° F.) and humidity levels below 60%. This method can assist to remove stubborn contaminants like grease, oil residue, or particulate matter from complex geometries without damaging the metal surface. Thorough rinsing with DI water followed by drying using compressed air or nitrogen gas at ambient temperatures. In some examples, a final wipe-down with lint-free cloths can be employed to remove any remaining residue and prevent re-deposition during subsequent coating steps.

In examples, applying the sol-gel composition to a metal substrate involves several steps that are configured to enhance its wettability and reactivity with subsequent coatings, or treatments. The process begins by cleaning the metallic surface using a mild detergent or water-based solution, which is then thoroughly rinsed and dried to remove any residue. Next, the sol-gel composition is applied uniformly over large areas of the metal substrate using conventional coating techniques such as spraying, brushing, or rolling. This sol-gel treatment increases the hydrophilic nature of the metallic surface by creating a thin layer with unique chemical properties that facilitate better wetting and adhesion.

In examples, the sol-gel composition can be applied in multiple layers to achieve optimal coverage and uniformity on large areas such as aircraft wings or fuselage sections. In another example, targeted applications at specific areas may require additional testing to ensure consistency across the surface treatment process. The sol-gel layer may be tailored for different metal substrates by adjusting its composition and thickness according to their unique properties. For example, titanium surfaces may benefit from an etching step before applying the sol-gel treatment due to the presence of oxide layers that may interfere with adhesion performance. In contrast, CRES (Chromium-Electroplated Steel) can require a specialized treatment process involving chemical reactions between the sol-gel and metal substrate.

The thickness of each layer is typically within ranges of about 0.5 microns to about 2 microns for the sol-gel composition, and thinner, for example, on the order of less than 100 nanometers for the chemical reactivator, and from about 50 microns to about 150 microns for polyurethane or other polymer coatings applied over the treated surface. The combination of these layers further creates a surface energy profile that enhances adhesion between metal substrate and subsequent coatings.

In another example, controlled drying environments such as ovens or dryers may be employed for accelerated processing. For instance, a temperature-controlled oven set at approximately 40° C. may reduce the overall drying time while maintaining consistent results as compared to drying under ambient conditions. In yet another example, ultraviolet (UV) light exposure in combination with ambient air circulation can enhance curing rates and promote uniformity.

When applying sol-gel compositions or chemical reactivator to specific areas or features on metal substrates, targeted applications may require additional or alternate conditions or steps. This is particularly relevant when dealing with complex geometries such as rivets, fasteners, or other surface irregularities that may potentially compromise the integrity of the bond between coating and substrate. In examples, the use of equipment such as spin coaters or dip tanks in high-volume production can be used. Alternatively, specialized applicators may be used for applying chemical reactivator over dried sol-gel composition layers to provide uniform coverage and minimize waste. The applicator may include features such as adjustable nozzles or precision spray tips designed specifically for this purpose.

In further examples, a water-based polyurethane or other polymer clearcoat can be applied over the combined sol-gel and chemical reactivator layers using an electrostatic spray gun at ambient conditions with minimal air flow. In another example, a UV-curable pigmented coating may be used in conjunction with the present method and structures to provide improved color retention and gloss levels.

For specific applications like stencil markings or edge sealing on vertical fins and cockpit window frames of aircrafts, the present method can be particularly effective due to its ability to provide erosion protection without compromising adhesion. In these examples, a combination of sol-gel treatment with chemical reactivator may be applied directly over metal surfaces using targeted application techniques such as brush or roller coating. Moreover, the present method or compositions as described herein are not limited to aluminum substrates and may also apply to other metals like titanium, CRES-anodized surfaces, or even some polymers after suitable surface treatments.

Rain Erosion Resistance Testing

Several tests can be used to predict coating durability against rain erosion. The test described here utilizes a whirling arm. For intercoat evaluation, a first topcoat is applied over the complete upper surface of the test foil, while a second topcoat can be painted over only part of the foil, leaving the bullnose with only the first color applied. The painted foils are then mounted on a zero-lift rotating blade mounted inside a wooden barrel. The entire apparatus is enclosed in a blockhouse. Water droplets are sprayed from the periphery of the barrel as the blade rotates. Because of the speed of the rotating blade, the foils impact the water drops at speeds on the order of half the speed of sound, which is slightly faster than the speed of an airplane through most rain conditions. The impact of the droplets near the second topcoat paint edge produces a water hammer effect that creates Raleigh surface shock waves, which can cause intercoat bond failure. The localized stress produced in this test is an order of magnitude greater than that produced in a tape adhesion test according to ASTM D3359. Rain erosion resistance is then evaluated by measuring the distance the second topcoat peels back from its original paint edge.

While the present teachings have been illustrated with respect to one or more implementations, alterations and/or modifications may be made to the illustrated examples without departing from the spirit and scope of the appended claims. For example, it may be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or embodiments of the present teachings. It may be appreciated that structural objects and/or processing stages may be added, or existing structural objects and/or processing stages may be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items may be selected. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated embodiment. The terms "couple," "coupled," "connect," "connection," "connected," "in connection with," and "connecting" refer to "in direct connection with" or "in connection with via one or more intermediate elements or members." Finally, the terms "exemplary" or "illustrative" indicate the description is used as an example, rather than implying that it is an ideal. Other embodiments of the present teachings may be apparent to those skilled in the art from consideration of the specification and practice of the disclosure herein. It is intended that the specification and examples be considered as exemplary only, with a true scope and spirit of the present teachings being indicated by the following claims.

What is claimed is:

1. A method for adhering a coating to a metal substrate, comprising:
- exposing a surface of a metal substrate to a solvent;
- applying a sol-gel treatment layer to the metal substrate;
- drying the treated metal substrate;
- applying a chemical reactivator comprising a zirconium alkoxide or other metal alkoxide in a solvent formulation to the treated metal substrate to form a chemical reactivator layer disposed on the sol-gel treatment layer; and
- applying a polymer coating to the metal substrate; and wherein the polymer coating is disposed on the chemical reactivator layer and is applied directly over the chemical reactivator layer without the need for a primer.

2. The method of claim 1, further comprising cleaning the metal substrate with an alkaline cleaner prior to exposing a surface of the metal substrate to a solvent.

3. The method of claim 1, wherein the sol-gel treatment is applied in a thickness range of from about 0.5 microns to about 2 microns.

4. The method of claim 1, wherein the chemical reactivator is applied in a thickness range of below about 100 nanometers on top of the treated metal substrate after drying the treated metal substrate.

5. The method of claim 1, further comprising applying additional coatings or treatments over the polymer coating.

6. The method of claim 1, wherein the solvent comprises water.

7. The method of claim 1, wherein the solvent comprises a pH level between about 8 to about 9.

8. The method of claim 1, wherein the metal substrate comprises aluminum or an alloy thereof.

9. The method of claim 1, wherein drying the treated metal substrate comprises exposing the metal substrate to ambient conditions for at least one hour.

10. The method of claim 1, wherein the solvent further comprises a mild detergent.

11. The method of claim 1, wherein the polymer coating comprises a polyurethane.

12. The method of claim 1, wherein the polymer coating is a clearcoat, or transparent in a visible range.

13. The method of claim 1, wherein the polymer coating further comprises a pigment or additive.

14. A method to prevent erosion on leading edges of metal surfaces, the method comprising:

treating the metal surface with a solvent;

applying a sol-gel treatment to the metal surface;

applying a chemical reactivator comprising a zirconium alkoxide or other metal alkoxide in a solvent formulation directly onto the sol-gel treated metal surface; and applying a polyurethane coating on the metal surface without a primer.

15. The method to prevent erosion on leading edges of metal surfaces of claim 14, further comprising drying the metal surface after applying a sol-gel treatment to the metal surface.

16. The method to prevent erosion on leading edges of metal surfaces of claim 14, wherein:

the sol-gel treatment is applied in a thickness range of about 0.5 microns to about 2 microns; and the polyurethane coating has a thickness range of from about 50 microns to about 150 microns.

17. The method to prevent erosion on leading edges of metal surfaces of claim 14, wherein the metal surface comprises aluminum or an alloy thereof.

18. The method of claim 14, wherein the solvent further comprises a mild detergent.

19. The method of claim 14, wherein the polyurethane coating is a clearcoat or transparent in the visible range.

20. The method of claim 14, wherein the polyurethane coating further comprises a pigment or additive.

* * * * *